April 1, 1924.
H. V. STEER
PHOTO ENLARGING DEVICE
Filed June 10, 1921
1,488,950
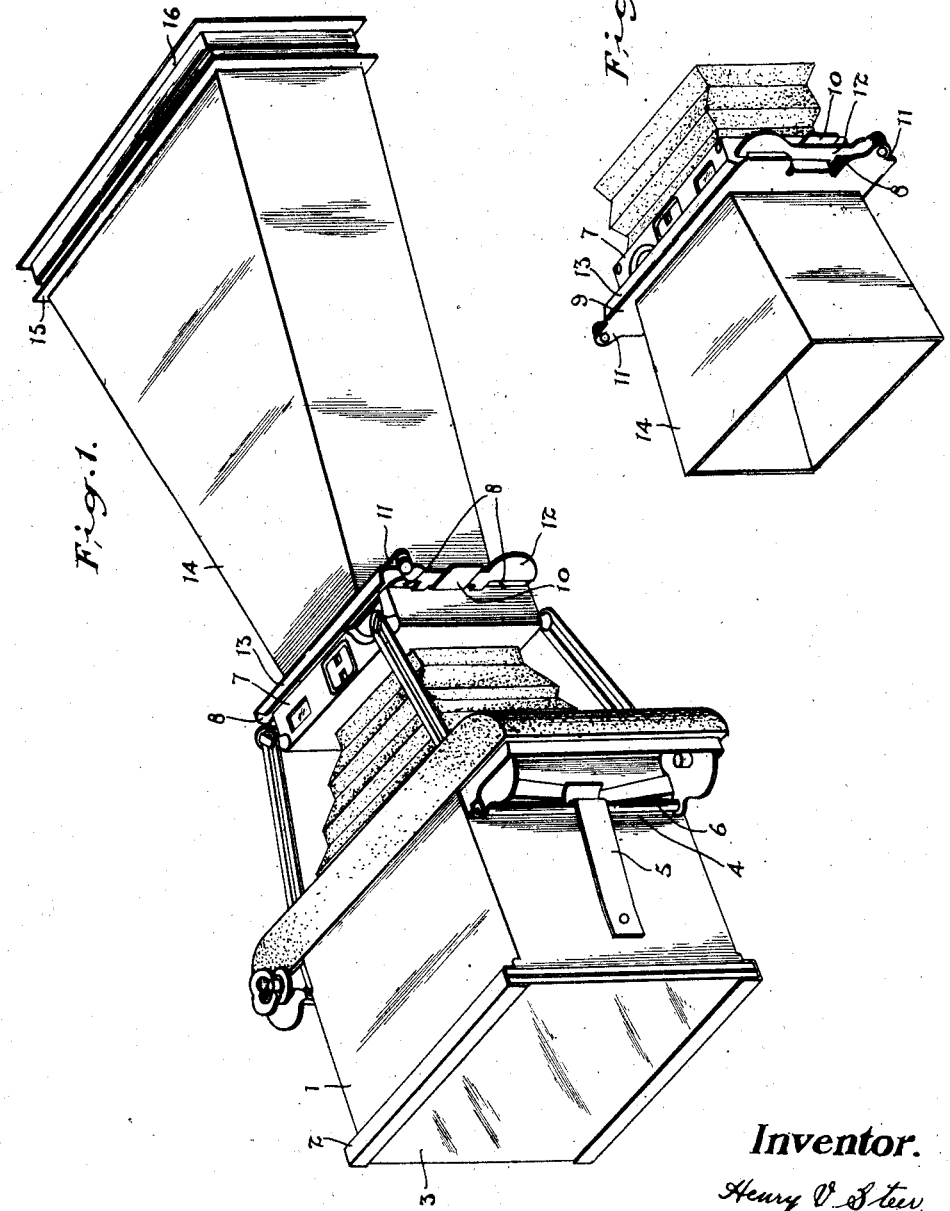
Inventor.
Henry V. Steer.
by
H. J. S. Dennison
Atty.

Patented Apr. 1, 1924.

1,488,950

UNITED STATES PATENT OFFICE.

HENRY V. STEER, OF TORONTO, ONTARIO, CANADA.

PHOTO-ENLARGING DEVICE.

Application filed June 10, 1921. Serial No. 476,601.

*To all whom it may concern:*

Be it known that I, HENRY V. STEER, a subject of the King of Great Britain, and resident of the city of Toronto, county of York, Province of Ontario, in the Dominion of Canada, have invented certain new and useful Improvements in Photo-Enlarging Devices, as described in the following specification and illustrated in the accompanying drawing, that forms part of the same.

The principal objects of this invention are to enable amateur photographers making enlarged prints from their own negatives by the use of the camera by which the negatives were made, and to devise a construction which may be produced as a standard attachment for a definite size of camera which may be very quickly attached or detached.

The principal feature of the invention consists in the novel construction of a pair of rigid casings whereby the negative is supported a definite distance from the camera lens in a detachable casing secured to the back of the camera and the printing sheet is supported a definite distance at the front of the camera lens.

In the drawings, Figure 1 is a perspective view showing my invention applied to a camera.

Figure 2 is a perspective view of the fastening device for securing the enlarging casing on the front of the camera, the view being from the opposite side to that shown in Figure 1.

Enlarging devices of various kinds have been used utilizing the camera lens, but these are of a complicated nature and require a great deal of care in adjustment.

The present invention consists of a metal casing 1 of rectangular form having an open back provided with a pair of longitudinal parallel channels 2 in which may be placed a double sheet of glass 3 between which is secured the negative film. The inward end of the casing is flanged to fit snugly against the back of the opening over which the film passes and side flanges 4 are formed thereon to ensure its being properly positioned.

Spring clips 5 engage the film rollers 6 to clamp the casing 1 in position. The depth of the casing 1 from the back of the camera to the film is definitely set and will therefore be always fixed.

The front plate 7 of the camera in which the lens is secured is here shown formed with laterally turned lugs 8 at the ends and over this plate is secured a plate 9 which is formed with offset lugs 10 which extend between the pairs of end lugs 8.

Lug projections 11 on the plate 9 carry the pivotal locking members 12 which are adapted to extend to the rear of the lugs 8 of the camera and in front of the offset lugs 10 of the plate. The plate 9 is thus locked securely to the front plate of the camera. The top and bottom edges of the plate 9 are formed with longitudinal flanges 13.

Secured to the plate 9 is a rectangular tapering casing 14 which flares outwardly and is formed with a ribbed flange 15 adjacent to its outer end. The outer end is the size of the print which it is desired to make from the smaller negative.

A cap 16 is adapted to fit on the outward end of the casing 14 and the print paper or card is inserted thereinto before said cap is placed into position.

In the use of this device, the camera is extended to its full focal length. The casing 14 is then clamped in position over the lens by means of the locking members and lugs described and the casing 1 is then secured to the back after the ordinary camera back has been removed. The negative is inserted and a suitable sheet of print paper is inserted in the cap and placed upon the casing 14 in a dark room. The negative end is then exposed to a suitable light and the print is made the full size of the sheet in the cap 16.

It will be seen that with a device such as described the printing apparatus may be very quickly set up and be handled very readily by amateur photographers.

What I claim as my invention is:—

1. A photo enlarging device, comprising, a flaring rectangular casing having a flange at one end adapted to fit against the lens plate of the camera, pivotal members secured to said flange adapted to overlap said lens plate and lock it to the flange, a print holding cap removably secured to the larger end of said casing, and a casing of fixed length adapted to be secured to the film back of the camera and to hold the film.

2. A photo enlarging device, comprising, the combination with the camera lens plate having lateral lug projections, of a flaring rectangular casing having a flanged end provided with lug projections at one side, and offset lugs midway of the width of the side flanges, pivotal members secured by the side lugs adapted to extend to one side of the offset lugs and to engage the opposite sides of the lug projections on the lens plate, and a print-holding cap removably secured to the larger end of the cap.

3. A photo enlarging device, comprising, a rectangular casing adapted to be secured to the film back of a camera having an open back and parallel channels to receive the negative, spring clips adapted to engage the film rollers of the camera to hold said camera in place, and a flaring casing adapted to be secured to the lens plate of the camera and having a print holder at the outer end.

HENRY V. STEER.